United States Patent
Akiyama et al.

(10) Patent No.: US 7,031,007 B2
(45) Date of Patent: Apr. 18, 2006

(54) FACSIMILE APPARATUS FOR IMAGE COMMUNICATIONS USING A COMPUTER NETWORK AND METHOD FOR CONTROLLING THE FACSIMILE APPARATUS

(75) Inventors: Atsushi Akiyama, Shizuoka-ken (JP); Masashi Watanabe, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 882 days.

(21) Appl. No.: 09/911,656

(22) Filed: Jul. 24, 2001

(65) Prior Publication Data

US 2002/0015182 A1 Feb. 7, 2002

(30) Foreign Application Priority Data

Jul. 27, 2000 (JP) .............................. 2000-227212

(51) Int. Cl.
*G06F 15/00* (2006.01)
*G06F 15/16* (2006.01)
*H04N 1/00* (2006.01)
*H04M 1/00* (2006.01)

(52) U.S. Cl. .................. 358/1.15; 358/1.13; 358/1.16; 358/400; 379/100.01; 709/206

(58) Field of Classification Search .............. 358/1.15, 358/1.16, 468, 400; 379/100.01; 709/206
See application file for complete search history.

(56) References Cited

U.S. PATENT DOCUMENTS 6,437,873 B1 * 8/2002 Maeda ................... 358/1.15
6,690,480 B1 * 2/2004 Maeda ................... 358/1.15

* cited by examiner

*Primary Examiner*—Kimberly Williams
*Assistant Examiner*—Thomas J Lett
(74) *Attorney, Agent, or Firm*—Frishauf, Holtz, Goodman & Chick, P.C.

(57) ABSTRACT

In Internet FAX communications, a CPU acquires a recipient mail address designated by a user or an originator mail address indicated in received mail. The CPU then stores the acquired mail address in a recipient-address storage area or an originator-address storage area that is included in an information storage section. If any one of mail addresses stored in the recipient- or originator address storage area is selectively designated when a recipient of the Internet FAX communications is designated, the CPU sets the selectively-designated mail address as a recipient address.

12 Claims, 8 Drawing Sheets

| Mail address | Resolution | Encoding mode | Paper size |
|---|---|---|---|
| a@aaa.aaa | 200×200 | MR | A4 |
| b@bbb.bbb | 200×200 | JBIG | Letter |
| c@ccc.ccc | 400×400 | MH | Legal |
| d@ddd.ddd | 200×200 | MH | Leisure |
| | | | |

FIG. 2

| Mail address |
|---|
| w@www.www |
| x@xxx.xxx |
| y@yyy.yyy |
| z@zzz.zzz |
| |

FIG. 3

| Message ID | Mail address | Resolution | Encoding mode | Paper size | Communication result |
|---|---|---|---|---|---|
| 0001 | a@aaa.aaa | 200×200 | MH | A4 | OK |
| 0002 | b@bbb.bbb | 200×200 | JBIG | Letter | OK |
| 0003 | a@aaa.aaa | 200×200 | MR | A4 | SENT |
| 0004 | c@ccc.ccc | 200×200 | MH | Legal | DLVD |
| 0005 | b@bbb.bbb | 200×200 | JBIG | Letter | OK |
| ⋮ | ⋮ | ⋮ | ⋮ | ⋮ | ⋮ |

FIG. 8

| Mail address | Reception date and time | Communication result |
|---|---|---|
| x@xxx.xxx | 2000-03-28 14:40 | OK |
| y@yyy.yyy | 2000-03-28 16:30 | NG |
| z@zzz.zzz | 2000-03-28 20:00 | OK |
| y@yyy.yyy | 2000-03-28 13:20 | NG |
| z@zzz.zzz | 2000-03-29 05:00 | OK |
| ⋮ | ⋮ | ⋮ |

FIG. 9

| Message ID | Mail address | Resolution | Encoding mode | Paper size | Communication result |
|---|---|---|---|---|---|
| 0001 | a@aaa.aaa | 200×200 | MR | A4 | OK |
| 0002 | b@bbb.bbb | 200×200 | JBIG | Letter | OK |
| 0003 | a@aaa.aaa | 200×200 | MR | A4 | SENT |
| 0004 | c@ccc.ccc | 200×200 | MH | Legal | DLVD |
| 0005 | b@bbb.bbb | 200×200 | JBIG | Letter | OK |
| ⋮ | ⋮ | ⋮ | ⋮ | ⋮ | ⋮ |

FIG. 10

FACSIMILE APPARATUS FOR IMAGE COMMUNICATIONS USING A COMPUTER NETWORK AND METHOD FOR CONTROLLING THE FACSIMILE APPARATUS

CROSS-REFERENCE TO RELATED APPLICATIONS

This application is based upon and claims the benefit of priority from the prior Japanese Patent Application No. 2000-227212, filed Jul. 27, 2000, the entire contents of which are incorporated herein by reference.

BACKGROUND OF THE INVENTION

1. Field of the Invention

The present invention relates to a facsimile apparatus for image communications using a computer network such as the Internet and a method for controlling the facsimile apparatus.

2. Description of the Related Art

A facsimile apparatus using a PSTN (Public Switched Telephone Network) and an ISDN (Integrated Services Digital Network) is generally used for communicating an image to a remote site. This type of facsimile apparatus is easy to operate and capable of sending a message to the other party even when he or she is absent. Therefore, it comes into widespread use in homes as well as in the field of business. The communication standard of the facsimile apparatus using a PSTN and an ISDN is recommended as a G3 standard and a G4 standard by the ITU (International Telecommunication Union).

The following are advantages of the above-described related art facsimile apparatus. Since a communication line is secured between a sending-side facsimile apparatus and a receiving-side facsimile apparatus, data can be transferred at the highest communication speed that is allowed by the bandwidth of the communication line. Since a user directly communicates with the other party, he or she can confirm whether the other party has received data with reliability. Since, moreover, capability negotiations are performed to confirm whether the format of data to be transmitted can be received at the receiving end, data can reliably be transmitted.

Communications services using the Internet in place of the conventional circuit switching network have become popular due to the widespread use of the Internet. If, in particular, a transmission distance is long and an amount of data to be transmitted is large, the costs of communications using the Internet can be decreased more than those of communications using the circuit switching network. For this reason, a so-called Internet facsimile apparatus having a function of transmitting/receiving an image via the Internet as well as functions of a conventional facsimile apparatus has made its appearance.

The Internet facsimile apparatus generally transmits image data via the Internet as an attached file of electronic mail. Since the receiving party is identified by a mail address, a user of the apparatus inputs the mail address to specify the receiving party.

In general, however, the number of digits of a mail address is larger than that of a telephone number, and the mail address is complicated. To designate a mail address therefore places a great burden on a user.

There is an Internet facsimile apparatus capable of registering mail addresses by abbreviated dialing. In this apparatus, a user need not input a mail address if it has been registered by abbreviated dialing, but the user has to input a mail address repeatedly if it is not registered. Consequently, when a user makes communication with the other party several times for a short time period without registering a mail address of the other party by abbreviated dialing, the user must designate the mail address each time he or she wishes to communicate with the other party.

BRIEF SUMMARY OF THE INVENTION

An object of the present invention is to provide a facsimile apparatus that greatly improves in usability by greatly saving user's time and labor in order to specify the other party with whom a user carried out communications.

In order to attain the above object, a facsimile apparatus for allowing facsimile communications through a computer network, according to one aspect of the present invention, comprises a storage section, an address acquisition section for acquiring an address of the other party of the facsimile communications during the facsimile communications, an address storage control section for storing at least the address acquired by the address acquisition section in the storage section when the address is not stored in the storage section, and an address designation section for designating an address selectively from addresses stored in the storage section when the other party of the facsimile communications is designated and setting the designated address as an address of the other party.

A method of controlling a facsimile apparatus having a storage section and capable of facsimile communications through a computer network, according to another aspect of the present invention, comprises an address acquisition step of acquiring an address of other party of the facsimile communications during the facsimile communications, an address storage control step of storing at least the address acquired in the address acquisition step in the storage section when the address is not stored in the storage section, and an address designation step of designating an address selectively from addresses stored in the storage section when the other party of the facsimile communications is designated and setting the designated address as an address of the other party.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

FIG. 2 is a schematic diagram of the structure of a recipient-address storage area set in an information storage section of the apparatus shown in FIG. 1;

FIG. 3 is a schematic diagram of the structure of an originator-address storage area set in the information storage section of the apparatus shown in FIG. 1;

FIG. 8 is a schematic diagram of a modification to the structure of the recipient-address storage area set in the information storage section of the apparatus shown in FIG. 1;

FIG. 9 is a schematic diagram of a modification to the structure of the originator-address storage area set in the information storage section of the apparatus shown in FIG. 1; and FIG. 10 is a schematic diagram of a modification to the structure of the originator-address storage area set in the information storage section of the apparatus shown in FIG. 1.

DETAILED DESCRIPTION OF THE INVENTION

An Internet facsimile apparatus according to an embodiment of the present invention will now be described with reference to the accompanying drawings.

Figure 1:
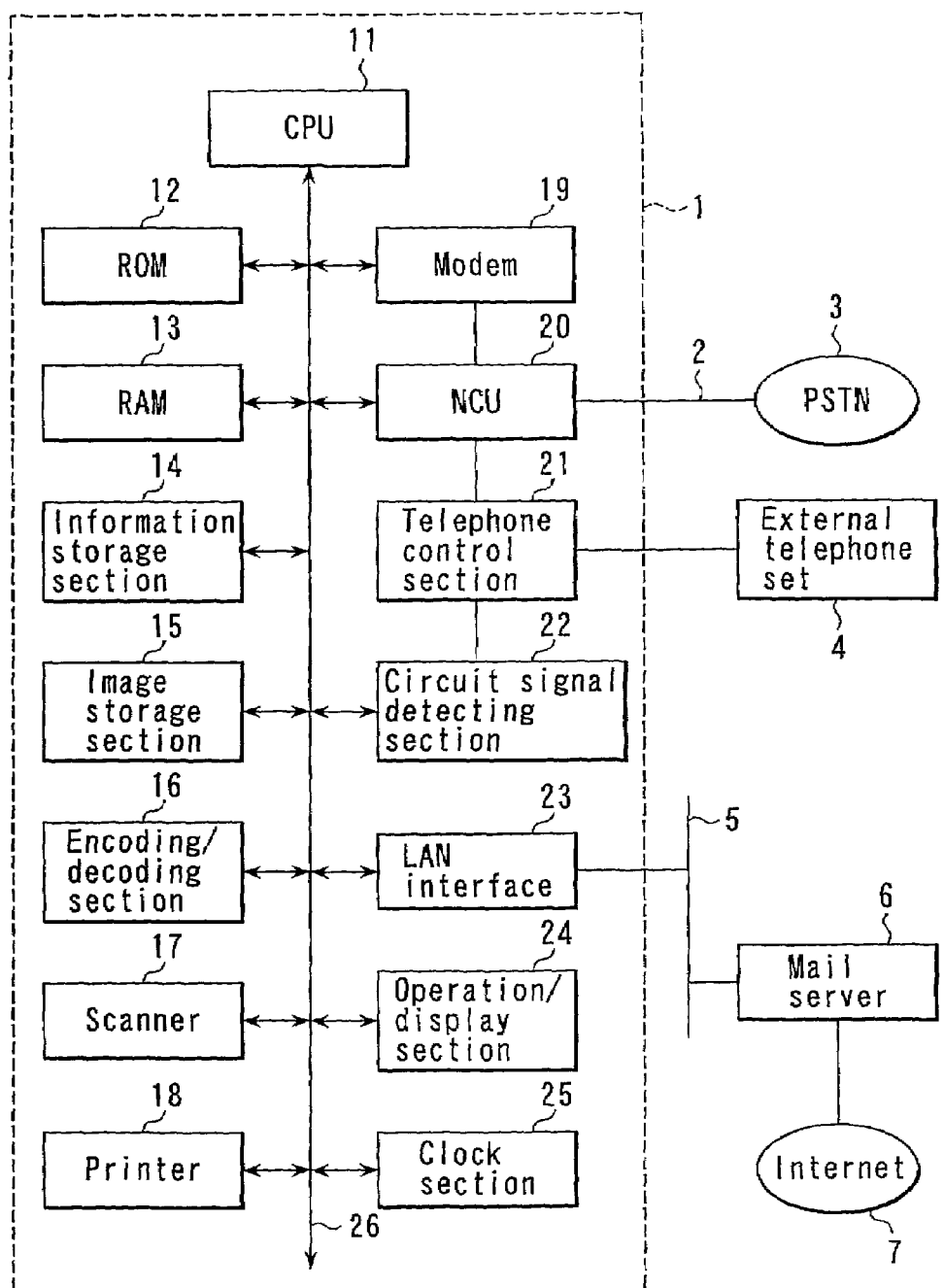
FIG. 1 is a block diagram showing a major part of an Internet facsimile apparatus according to an embodiment of the present invention.

FIG. 1 is a block diagram showing a major part of the Internet facsimile apparatus.

In FIG. 1, it is the Internet facsimile apparatus that is denoted by reference numeral 1. The apparatus 1 comprises a CPU 11, a ROM 12, a RAM 13, an information storage section 14, an image storage section 15, an encoding/decoding section 16, a scanner 17, a printer 18, a modem 19, an NCU 20, a telephone control section 21, a circuit signal detecting section 22, a LAN interface 23, an operation/display section 24, and a clock section 25.

The CPU 11, ROM 12, RAM 13, information storage section 14, image storage section 15, encoding/decoding section 16, scanner 17, printer 18, modem 19, NCU 20, circuit signal detecting section 22, LAN interface 23, operation/display section 24, and clock section 25 are connected to each other through a system bus 26.

Both the modem 19 and the telephone control section 21 are connected to the NCU 20. The circuit signal detecting section 22 is connected to the telephone control section 21.

The CPU 11 executes overall control of respective sections based on control programs stored in the ROM 12 to thereby perform an operation of the Internet facsimile apparatus.

The ROM 12 stores control program of the CPU 11.

The RAM 13 stores various types of information necessary for performing various processes by the CPU 11.

The information storage section 14, which includes a flash memory, stores various types of setting information and other information. The section 14 includes storage regions corresponding to an abbreviated-dialing registration area for storing telephone numbers and mail addresses that are registered by abbreviated dialing, a recipient-address storage area (described later), and an originator-address storing area (described later).

The image storage section 15 includes a large-capacity DRAM or a hard disk drive and temporarily stores received image data and transmission-wait image data.

The encoding/decoding section 16 encodes image data for compression of redundancy and decodes image data decoded for compression of redundancy.

The scanner 17 scans a sending document to generate image data indicating the document.

The printer 18 prints an image corresponding to the image data on printing paper.

The modem 19 modulates the image data to produce a facsimile transmission signal and modulates a command supplied from the CPU 11 to generate a command transmission signal. The modem 19 sends out these transmission signals to a PSTN subscriber line 2 via the NCU 20. The modem 19 also demodulates facsimile transmission data, which comes through the PSTN subscriber line 2 and the NCU 20, to reproduce image data and demodulates a command transmission signal to reproduce a command.

The PSTN subscriber line 2 is connected to the PSTN 3 and the NCU 20. The NCU 20 monitors a status of the PSTN subscriber line 2 and transmits a signal to the PSTN 3 through the line 2. The NCU 20 equalizes a facsimile transmission signal to be transmitted to the PSTN subscriber line 2 and sets a level thereof.

An external telephone set 4 is connected to the telephone control section 21 when the need arises. The section 21 performs a known control process for allowing a call through the PSTN subscriber line 2 using the external telephone set 4.

The circuit signal detecting section 22 receives signals coming through the PSTN subscriber line 2, the NCU 20, and the telephone control section 21 to detect whether a given signal has come or not.

The Internet 7 is connected to the LAN interface 23 through a LAN circuit 5 and a mail server 6. The LAN interface 23 transmits data via the Internet 7.

The operation/display section 24 includes a key input section for receiving user's instructions for the CPU 11 and a display section for displaying various types of information to be sent to the user under control of the CPU 11.

The clock section 25 performs a clock operation at all times to output present-time information indicating the present time.

FIG. 2 is a schematic diagram showing a memory map of a recipient-address storage area set in the information storage section 14. As FIG. 2 shows, the recipient-address storage area includes storage areas capable of storing a plurality of sets of a mail address, resolution, an encoding mode, and a paper size in correspondence with one another.

FIG. 3 is a schematic diagram showing a memory map of an originator-address storage area set in the information storage section 14. AS FIG. 3 shows, the originator-address storage area includes storage areas capable of storing a plurality of mail addresses.

The CPU 11 functions as an address acquisition section, an address storage control section, a communication capability acquisition section, a communication capability storage control section, a communication capability update section, and an address registration section as well as commonly-known control sections when the CPU 11 operates based on the control programs stored in the ROM 12.

The address acquisition section acquires mail addresses of a recipient and an originator during facsimile transmission via the Internet 7 (referred to as Internet FAX transmission hereinafter) and facsimile reception via the Internet 7 (referred to as Internet FAX reception hereinafter).

The address storage control section stores the mail addresses acquired by the address acquisition section in the recipient-address and originator-address storage areas of the information storage section 14.

The communication capability acquisition section acquires the communication capability of the Internet facsimile apparatus during the Internet FAX transmission.

The communication capability storage control section stores the communication capability acquired by the communication capability acquisition section in the recipient-address storage area of the information storage section 14 in correspondence with the mail address of the same party.

The communication capability update section updates information of the communication capability stored in the recipient-address storage area based on the contents of affirmation mail received from the recipient after the Internet FAX transmission.

The address registration section registers the mail addresses stored in the recipient-address storage areas and originator-address storage areas of the information storage section by abbreviated dialing in response to a user's instruction.

An operation of the Internet facsimile apparatus constituted as described above will now be described.

Needless to say, the Internet facsimile apparatus 1 is able to make facsimile communications with another facsimile terminal in a one-to-one correspondence via the PSTN 3 and the Internet 7. Since, in this case, the operation of the apparatus 1 is similar to that of a conventional one, its descriptions are omitted.

Only the characteristic operations of the Internet facsimile apparatus of the present invention will now be described in detail.

Figure 4:
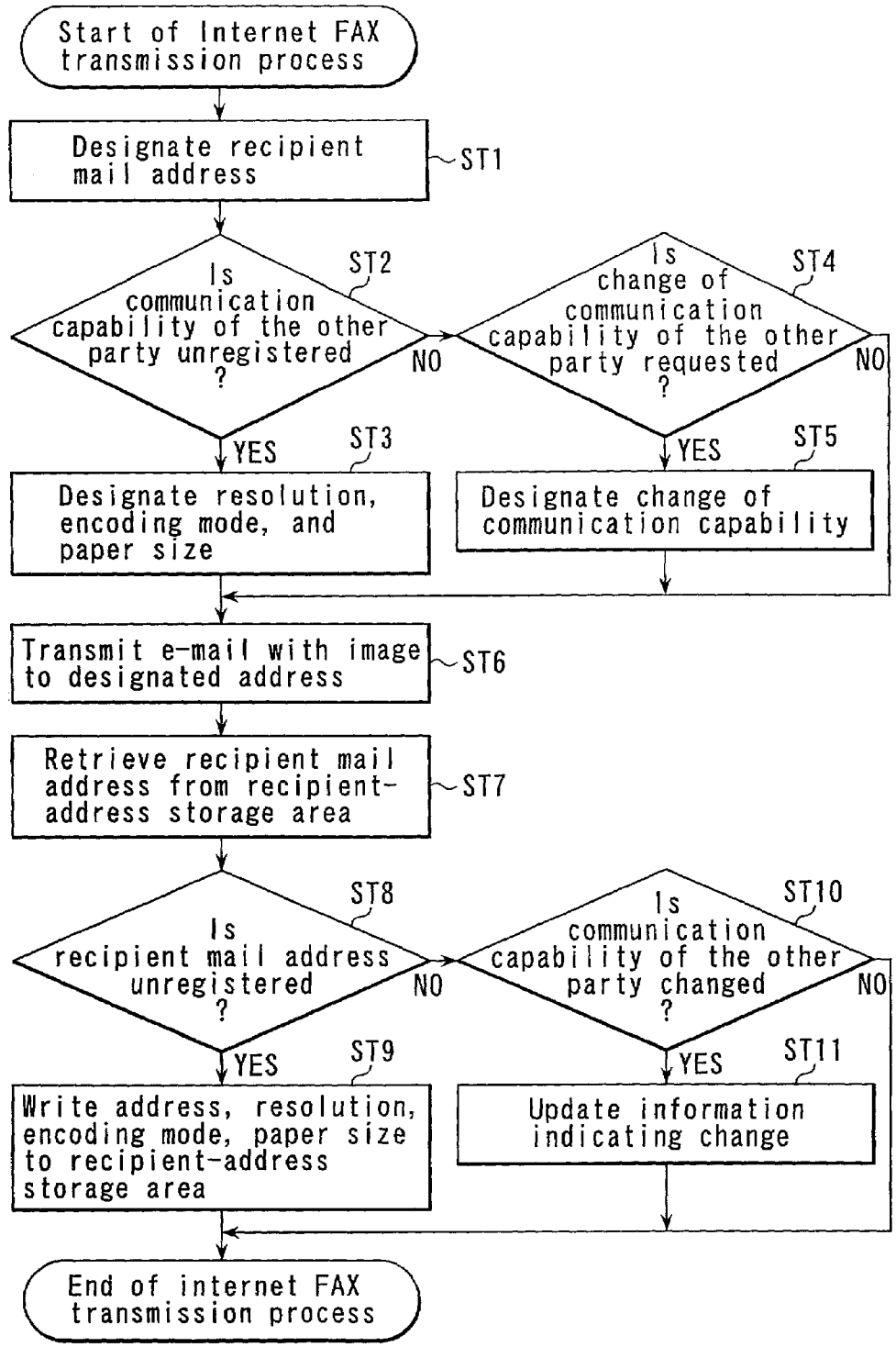
FIG. 4 is a flowchart showing an Internet FAX transmission process performed by a CPU of the apparatus shown in FIG. 1.

If a user requests execution of Internet FAX transmission at any given time, then the CPU 11 performs an Internet FAX transmission process as shown in FIG. 4.

In the Internet FAX transmission process, the CPU 11 first designates a recipient mail address (step ST1). The designation is performed by the operation/display section 24; however, it can be done by various methods, such as direct input of mail addresses, abbreviated dialing, and selection from stored addresses.

Then, the CPU 11 confirms whether the communication capability of the other party with the designated mail address is registered or not in correspondence with the mail address (step ST2). In the present embodiment, the communication capability is defined as the resolution to be processed, the encoding mode to be analyzed, and the size of recording paper to be used.

There may be cases where the communication capability is registered if the mail address is designated by abbreviated dialing or selected from the recipient-address storage information (described later). When the CPU 11 confirms that no communication capability is registered, it designates the communication capability of the recipient or the resolution, encoding mode, and paper size (step ST3).

In contrast, when the CPU 11 confirms that the above communication capability is registered in step ST2, it also confirms whether the user requests the CPU to change the registered communication capability (step ST4). The CPU 11 designates a change of the communication capability only when the user requests the change (step ST5).

After the recipient and its communication capability are determined, the CPU 11 transmits electronic mail with image data to the Internet 7 from the LAN interface 23, using the designated mail address as a recipient address (step ST6).

If the transmission of the electronic mail is completed, the CPU 11 retrieves the designated recipient mail address from the recipient-address storage area (step ST7) and confirms whether the mail address is unregistered or not (step ST8).

If the CPU 11 confirms that the mail address is unregistered in the recipient-address storage area, it writes the mail address and the determined communication capability of the resolution, encoding mode and paper size, as one set, to the recipient-address storage area (step ST9). The CPU 11 thus ends the Internet FAX transmission process with the write step.

If the CPU 11 confirms in step ST8 that the mail address has been registered in the recipient-address storage area, it also confirms whether the determined communication capability of the recipient, which is stored in the recipient-address storage area together with the mail address, is changed or not (step ST10). Only when the communication capability is changed, the CPU 11 updates information indicating the change of the communication capability (step ST11). The CPU 11 thus ends the Internet FAX transmission processing with the update step.

Figure 5:
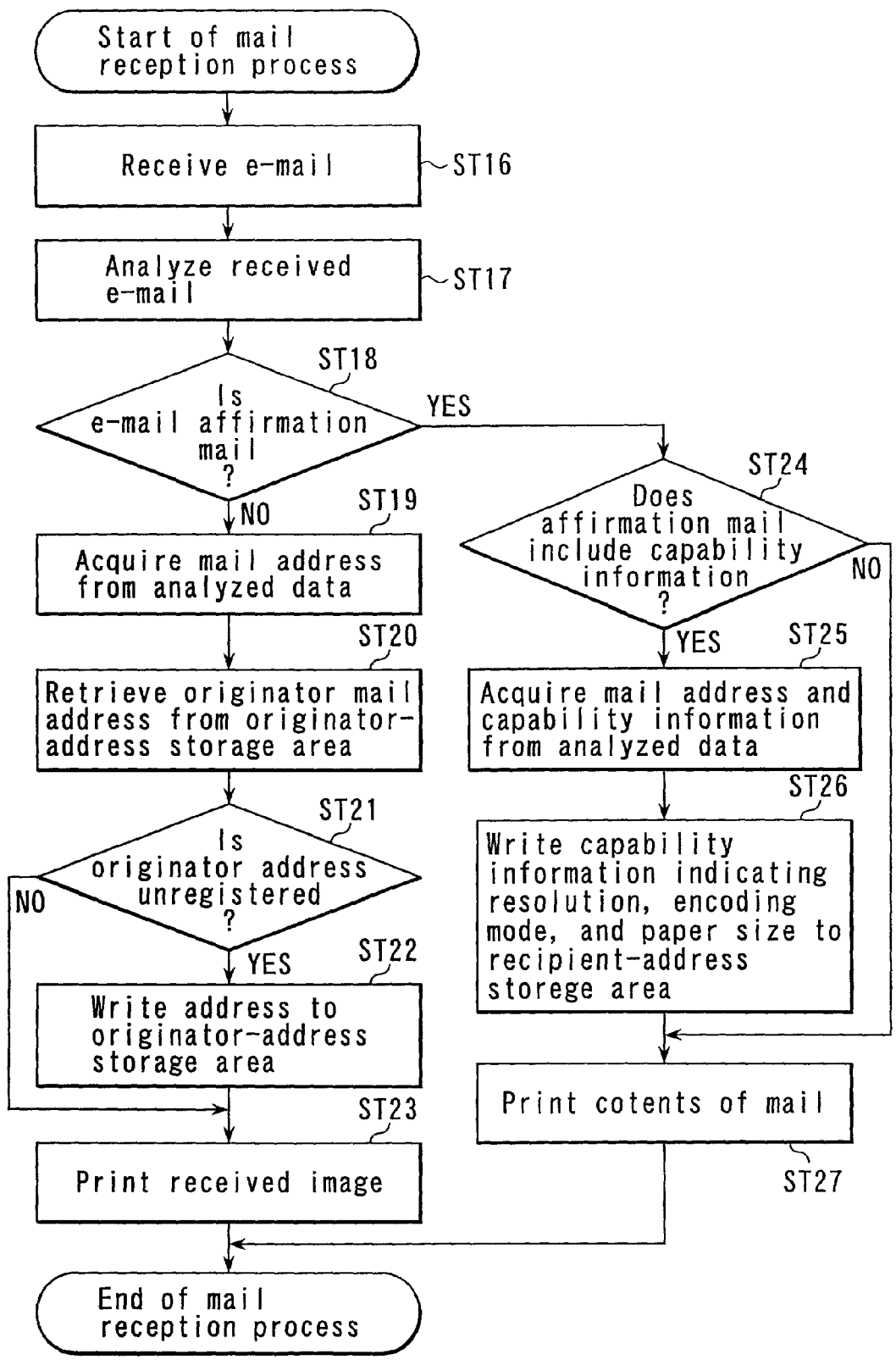
FIG. 5 is a flowchart showing a mail reception process performed by the CPU of the apparatus shown in FIG. 1.

When electronic mail is supplied to the Internet facsimile apparatus 1 via the Internet 7, mail server 6 and LAN 5, the CPU 11 performs mail reception process as shown in FIG. 5.

In the mail reception processing, the CPU 11 first receives the electronic mail described above (step ST16) and analyzes it (step ST17).

The electronic mail is analyzed to confirm whether it is affirmation mail or not (step ST18). The affirmation mail is response mail from the recipient in response to the electronic mail transmitted from the Internet facsimile apparatus 1.

If the CPU 11 confirms that the received electronic mail is not affirmation mail but normal electronic mail, it acquires an originator mail address from the analyzed data (step ST19). Then, the CPU 11 retrieves the acquired mail address from the originator-address storage area (step ST20) and confirms whether the mail address is unregistered or not in the originator-address storage area (step ST21). Only when the originator mail address is unregistered in the originator-address storage area, the CPU 11 writes the originator mail address to the originator-address storage area (step ST22).

After that, the CPU 11 causes the printer 18 to print an image corresponding to image data attached to the received electronic mail (step ST23). If the printing is completed, the mail reception process ends.

When the CPU 11 confirms in step ST18 that the received electronic mail is affirmation mail, it also confirms whether the affirmation mail contains capability information indicating the communication capability of the originator of the affirmation mail or the party on the other end (step ST24). If the CPU 11 confirms that the affirmation mail contains the capability information, it acquires the mail address and the capability information from the analyzed data (step ST25) and updates the resolution, encoding mode and paper size regarding the acquired mail address, which are registered in the recipient-address storage area, in accordance with the capability information (step ST26).

After the update step is completed or when the CPU 11 confirms in step ST 24 that the affirmation mail contains no capability information, the CPU 11 causes the printer 18 to print the contents of the affirmation mail (step ST27). If the printing is completed, the mail reception process ends.

When Internet FAX transmission or Internet FAX reception is performed as described above, a recipient or originator mail address is acquired. If the acquired mail address is unregistered in the recipient or originator-address storage area, it is registered therein.

Figure 6:
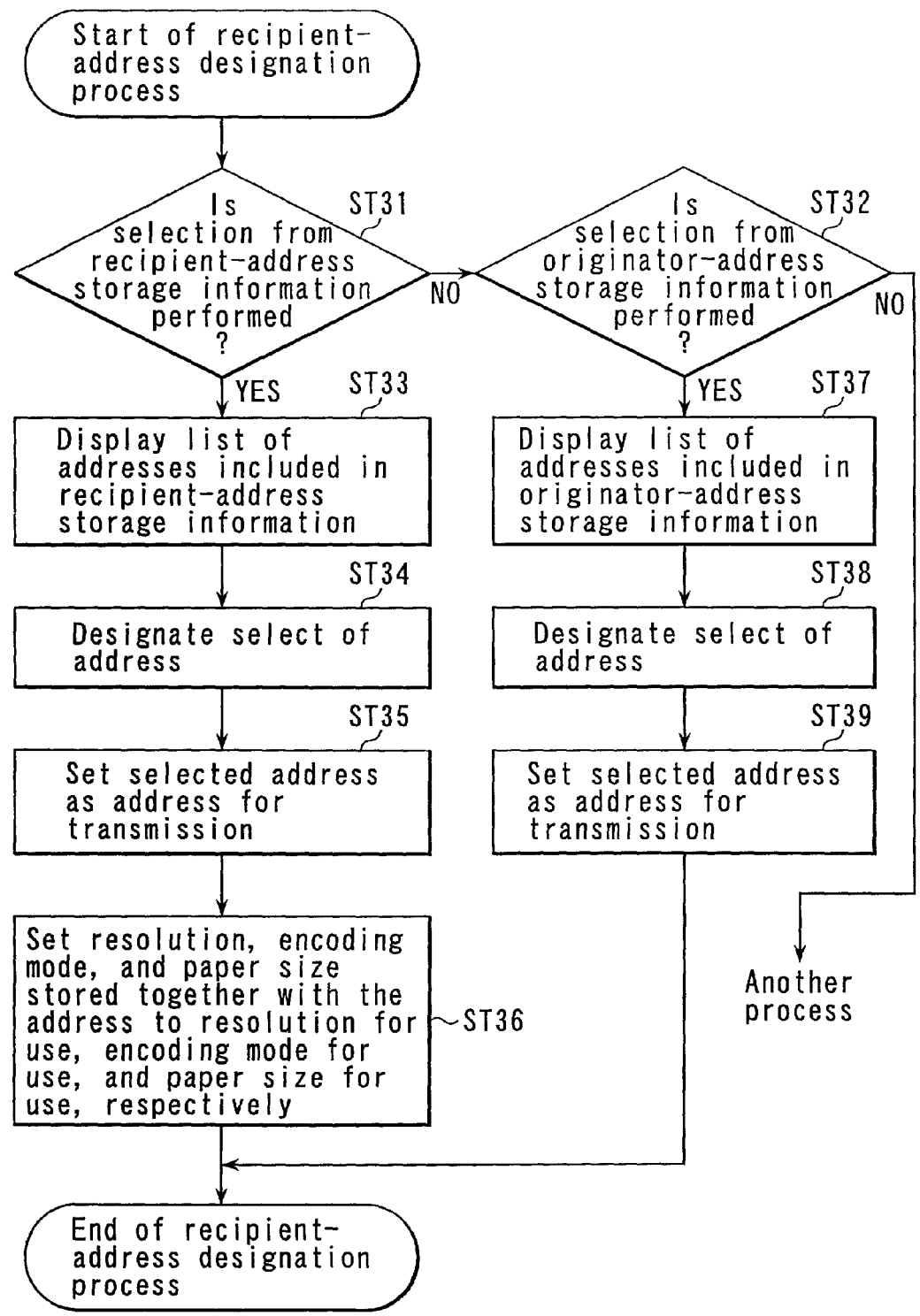
FIG. 6 is a flowchart showing a recipient-address designation process performed by the CPU of the apparatus shown in FIG. 1.

In the recipient-address designation step (ST1 in FIG. 1) in the Internet FAX transmission process, the CPU 11 designates a mail address selectively from mail addresses stored in the recipient- or originator-address storage areas. The CPU 11 thus performs the process shown in FIG. 6 in the foregoing recipient-address designation process.

In the foregoing recipient-address designation process, the CPU 11 first confirms whether to select one of information of mail addresses stored in the recipient-address storage area (referred to as recipient-address storage information hereinafter) and information of mail addresses stored in the originator-address storage area (referred to as originator-address storage information hereinafter) (steps ST31 and ST32). When a user requests another designation method such as direct input and abbreviated dialing, the CPU 11 shifts to another process that is executed through known steps according to the requested designation method.

If the CPU 11 confirms in step ST31 that the user has made a request to select a mail address from the recipient-address storage information, it prepares a list of mail addresses stored in the recipient-address storage area and displays it on the operation/display section 24 (step ST33). Under these circumstances, the CPU 11 selects a mail address from among the mail addresses stored in the recipient-address storage area (step ST34) and sets the selected mail address as an address for transmission (step ST35).

The CPU 11 also sets the resolution, encoding mode, and paper size, which are stored in the recipient-address storage area together with the selected mail address, to resolution for use, an encoding mode for use, and a paper size for use, respectively (step ST36). The recipient-address designation process ends with the step ST36.

On the other hand, if the CPU 11 confirms in step ST32 that the user has made a request to select a mail address from the originator-address storage information, it prepares a list of mail addresses stored in the originator-address storage area and displays it on the operation/display section 24 (step ST37). Under these circumstances, the CPU 11 selects a mail address from among the mail addresses stored in the originator-address storage area and displayed on the operation/display section 24 (step ST38), and sets the selected mail address as an address for transmission (step ST39). Since the originator-address storage area stores neither resolution nor an encoding mode nor a paper size, the CPU 11 simply sets the address for transmission as described above. The recipient-address designation process thus ends with the step ST39.

As described above, the recipient-address storage information and originator-address storage information can directly be used for designating a recipient address.

Figure 7:
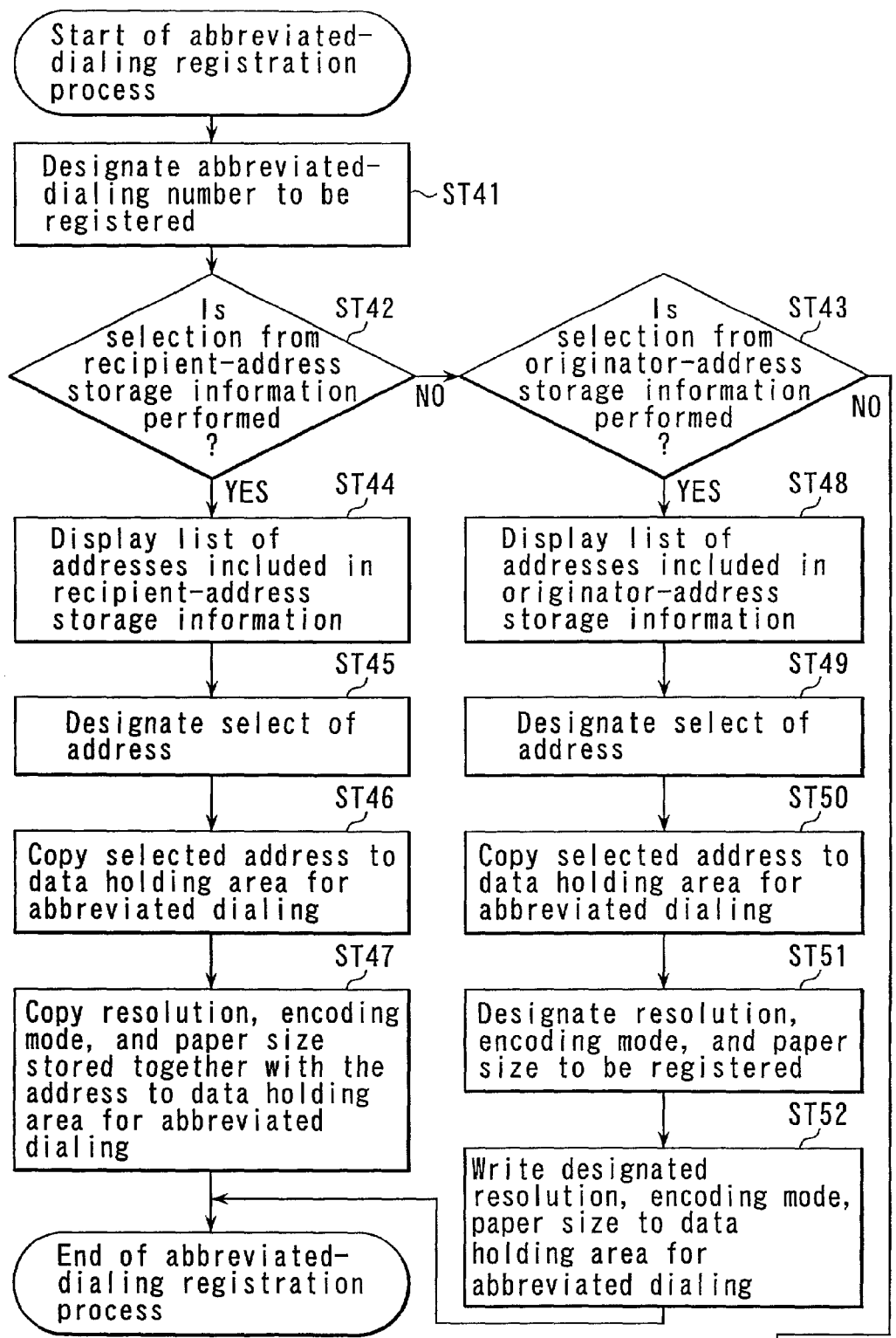
FIG. 7 is a flowchart showing an abbreviated-dialing registration process performed by the CPU of the apparatus shown in FIG. 1.

In the present embodiment, the CPU 11 performs an abbreviated-dialing registering process as described below to allow abbreviated dialing to be registered on the basis of the recipient-address storage information and originator-address storage information. In other words, the CPU 11 performs an abbreviated-dialing registering process as shown in FIG. 7 when a user makes a request to register abbreviated dialing.

In the abbreviated-dialing registering process, the CPU 11 first accepts an abbreviated-dialing number to be registered (step ST41).

Then, the CPU 11 confirms whether to select a mail address from the recipient-address storage information stored in the recipient address storage area or the originator-address storage information stored in the originator-address storage area (steps ST42 and ST43). If the user requests another designation method such as direct input and abbreviated dialing, the CPU 11 shifts to another process that is executed through known steps according to the requested designation method.

If the CPU 11 confirms in step ST42 that the user has made a request to select a mail address from the recipient-address storage information, it prepares a list of mail addresses stored in the recipient-address storage area and displays it on the operation/display section 24 (step ST44) Under these circumstances, the CPU 11 accepts a mail address selected from among the mail addresses stored in the recipient-address storage area (step ST45) and copies the selected mail address to a data holding area (the abbreviated-dialing registration area) for designated abbreviated-dialing numbers (step ST46).

The CPU 11 also copies information of the resolution, encoding mode, and paper size, which is stored in the recipient-address storage area together with the selected mail address, to the data holding area (step ST47). The abbreviated-dialing registering process ends with the step ST47.

On the other hand, if the CPU 11 confirms in step ST43 that the user has made a request to select a mail address from the originator-address storage information, it prepares a list of mail addresses stored in the originator-address storage area and displays it on the operation/display section 24 (step ST48). Under these circumstances, the CPU 11 selects a mail address from among the mail addresses stored in the originator-address storage area and displayed on the operation/display section 24 (step ST49), and copies the selected mail address to a data holding area for designated abbreviated-dialing numbers (step ST50).

Though the recipient's usable resolution, encoding mode and paper size information need to be written to the same data holding area to which the mail address is copied in step ST50, the originator-address storage area does not store the information. The CPU 11 thus designates terminals communication capability to be registered, i.e., resolution to be processed, an encoding mode to be analyzed, and a recording paper size to be used (step ST51). Then, the CPU 11 writes the designated information of resolution, encoding mode and paper size to the same data holding area to which the mail address is copied in step ST50 (step ST52). The abbreviated-dialing registering process ends with the step ST52.

According to the embodiment described above, when Internet FAX transmission or Internet FAX reception is performed, a mail address of the other party is acquired and stored in the recipient-address storage area or the originator-address storage area. In the case of the Internet FAX transmission, a user can freely select a recipient address from among the mail addresses stored in the recipient- and originator-address storage areas.

Let us consider a case where a user makes communications with the other party not frequently but several times for a short time period and the user need not register a mail address of the other party by abbreviated dialing. If the user directly inputs the mail address only once or receives electronic mail from the other party first in this case, the user has only to select an appropriate one from among the stored candidates when Internet FAX transmission is performed afterward. The burden on the user can thus be reduced greatly. Further, the risk of user's causing an error when the user directly inputs a mail address can be avoided.

In the present embodiment, the same mail addresses are prevented from being stored in the recipient- and originator-address storage areas. Therefore, the limited storage capacity can effectively be used and the largest number of mail addresses can be stored.

According to the present embodiment, the mail addresses stored in the recipient- and originator-address storage areas can be registered by abbreviated dialing. To register a mail address of the other party with whom a user has made Internet FAX communications, therefore, the user need not directly input the mail address and the burden of abbreviated-dialing registration on the user can be reduced.

In the present embodiment, information of communication capability of the other party having a mail address, which is specified when a user performs the latest Internet FAX transmission with the other party, is stored in the recipient-address storage area in correspondence with the mail address of the other party. Unless the communication capability of the other party changes, it need not be specified every time and thus the burden on the user is reduced. If, moreover, affirmation mail comes and it indicates communication capability, the information stored in the recipient-address storage area is updated so as to reflect the communication capability. It is thus possible to correct the information in the recipient-address storage area even when the communication capability is designated inappropriately in Internet FAX transmission.

The present invention is not limited to the foregoing embodiment. In the embodiment, the same mail addresses are prevented from being stored in the recipient- and originator-address storage areas. However, all of mail addresses acquired every communication can be stored therein even though the same mail addresses are stored. In this case, the efficiency of storage of mail addresses becomes lower than that in the present embodiment. If a message ID and a communication result are added to the recipient-address storage area every communication as shown in FIG. 8 or a reception date and time and a communication result are added to the originator-address storage area as shown in FIG. 9, the acquired mail addresses can be used as a history of communications. Since most of Internet facsimile apparatus have a function of preparing a communication history, the communication history can easily be obtained using the function. The storage capacity is limited, so that in actuality all of the mail addresses acquired by communications for a fixed time period are stored. The fixed time period corresponds to a period of time from the oldest communication to the latest communication if a memory address of the oldest communication is deleted when a new mail address should be stored in the storage area that is full of mail addresses. The fixed time period can also be defined as the last several days.

When all of the mail addresses acquired every communication are stored even though they include the same mail addresses, and the communication capabilities of the old communication and latest communication regarding the same mail addresses differ from each other, the communication capability of the old communication can be updated so as to conform to that of the latest communication. More specifically, in the example of FIG. 8, communication of message ID "0001" and communication of message ID "0003", differ from each other in encoding mode. When information on communication of message ID "0003" is registered as shown in FIG. 10, the encoding mode of the communication of message ID "0001" is updated to the same encoding mode "MR" as that of the communication of message ID "0003." By doing so, the optimum communication can be done using capability information acquired by the latest communication even when the message ID "0001" is designated as a recipient.

In the above embodiment, the recipient-address storage area and the originator-address storage area are provided separately from each other. They can be combined into a single area.

In the above embodiment, the resolution and encoding mode are exemplified as communication capabilities. Only one of them can be adopted or any other information can be added.

In the above embodiment, the abbreviated dialing is exemplified as a simple address designating function. Another simple address designating function such as a single-button dialing function and a telephone directory function can be used in the present invention.

According to the above embodiment, in the Internet FAX transmission, the CPU 11 designates the resolution to be processed and the encoding mode to be analyzed in steps ST3 and ST4 if the communication capability of the other party having a specified mail address is not registered in correspondence with the mail address. However, it can be confirmed whether a user designates the resolution and the encoding mode and, if the user does not designate them, he or she can select default values as the resolution and encoding mode.

In the above embodiment, the Internet is used as a computer network. Another network, such as a LAN (Local Area Network) and a WAN (Wide Area Network), can be used in the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A facsimile apparatus capable of performing facsimile communications through a computer network, said apparatus comprising:
   a storage section;
   an address acquisition section configured to acquire addresses of other parties of the facsimile communications during the facsimile communications;
   an address storage control section configured to store all of the addresses acquired by the address acquisition section for a given time period in the storage section so as to maintain a communication history;
   an address designation section configured to selectively designate an address of a desired one of the other parties from the addresses stored in the storage section and to set the designated address as a designated other party address;
   wherein the storage section comprises a recipient-address area and an originator-address area; and
   wherein when the other party of one of the facsimile communications is a recipient of the facsimile communication, the address of the other party is stored in the recipient-address area, and when the other party of one of the facsimile communications is an originator of the facsimile communication, the address of the other party is stored in the originator-address area.

2. The facsimile apparatus according to claim 1, wherein the address designation section receives a designation of one of the recipient-address storage area and the originator-address storage area, displays a list of addresses stored in the designated one of the storage areas, receives a request to selectively designate the desired address from the addresses in the displayed list, and sets the designated address from the list as the designated other party address.

3. The facsimile apparatus according to claim 1, wherein the storage section further comprises an abbreviated-dialing registration area; and wherein the facsimile apparatus further comprises an address registration section which receives a designation of a desired address stored in one of the recipient-address storage area and the originator-address storage area and registers the designated address in the abbreviated-dialing registration area.

4. The facsimile apparatus according to claim 3, wherein the address registration section receives a designation of one of the recipient-address storage area and the originator-address storage area, displays a list of addresses stored in the designated one of the storage areas, receives a request to selectively designate the desired address from the addresses in the displayed list, and registers the designated address from the list in the abbreviated-dialing registration area.

5. A method of controlling a facsimile apparatus which comprises a storage section and is capable of performing facsimile communications through a computer network, said method comprising:

acquiring addresses of other parties of the facsimile communications during the facsimile communications;

storing all of the addresses acquired by the address acquisition section for a given time period in the storage section so as to maintain a communication history;

selectively designating an address of a desired one of the other parties from the addresses stored in the storage section, and setting the designated address as a designated other party address;

wherein the storage section comprises a recipient-address area and an originator-address area; and wherein when the other party of one of the facsimile communications is a recipient of the facsimile communication, the address of the other party is stored in the recipient-address area, and when the other party of one of the facsimile communications is an originator of the facsimile communication, the address of the other party is stored in the originator-address area.

6. The method according to claim 5, wherein the selective designation of the address of the desired one of the other parties and the setting of the designated address as the designated other party address comprises:

receiving a designation of one of the recipient-address storage area and the originator-address storage area;

displaying a list of addresses stored in the designated one of the storage areas;

receiving a request to selectively designate the desired address from the addresses in the displayed list; and setting the designated address from the list as the designated other party address.

7. The method according to claim 5, wherein the storage section further comprises an abbreviated-dialing registration area, and said method further comprises:

receiving a designation of a desired address stored in one of the recipient-address storage area and the originator-address storage area; and registering the designated address in the abbreviated-dialing registration area.

8. The method according to claim 7, wherein the designating and registering of the desired address comprises:

receiving a designation of one of the recipient-address storage area and the originator-address storage area;

displaying a list of addresses stored in the designated one of the storage areas;

receiving a request to selectively designate the desired address from the addresses in the displayed list; and registering the designated address from the list in the abbreviated-dialing registration area.

9. A facsimile apparatus capable of performing facsimile communication through a computer network, said apparatus comprising:

storage means for storing data;

address acquisition means for acquiring addresses of other parties of the facsimile communications during the facsimile communications;

address storage control means for storing all of the addresses acquired by the address acquisition means for a given time period in the storage means so as to maintain a communication history;

address designation means for selectively designating an address of a desired one of the other parties from the addresses stored in the storage means and for setting the designated address as a designated other party address;

wherein the storage means comprises a recipient-address area and an originator-address area; and wherein when the other party of one of the facsimile communications is a recipient of the facsimile communication, the address of the other party is stored in the recipient-address area, and when the other party of one of the facsimile communications is an originator of the facsimile communication, the address of the other party is stored in the originator-address area.

10. The facsimile apparatus according to claim 9, wherein the address designation means receives a designation of one of the recipient-address storage area and the originator-address storage area, displays a list of addresses stored in the designated one of the storage areas, receives a request to selectively designate the desired address from the addresses in the displayed list, and sets the designated address from the list as the designated other party address.

11. The facsimile apparatus according to claim 9, wherein the storage means further comprises an abbreviated-dialing registration area; and wherein the facsimile apparatus further comprises address registration means for receiving a designation of a desired address stored in one of the recipient-address storage area and the originator-address storage area and for registering the designated address in the abbreviated-dialing registration area.

12. The facsimile apparatus according to claim 11, wherein the address registration means receives a designation of one of the recipient-address storage area and the originator-address storage area, displays a list of addresses stored in the designated one of the storage areas, receives a request to selectively designate the desired address from the addresses in the displayed list, and registers the designated address from the list in the abbreviated-dialing registration area.

* * * * *